(12) United States Patent
Shapiro

(10) Patent No.: US 9,193,368 B2
(45) Date of Patent: Nov. 24, 2015

(54) FOLD FLAT ARTICLE SUPPORT ASSEMBLIES WITH SIMPLIFIED RELEASE LATCHES AND STOWABLE SERVICE SHELVES

(71) Applicant: Richard N. Shapiro, Va Beach, VA (US)

(72) Inventor: Richard N. Shapiro, Va Beach, VA (US)

( * ) Notice: Subject to any disclaimer, the term of this patent is extended or adjusted under 35 U.S.C. 154(b) by 0 days.

(21) Appl. No.: 13/998,632

(22) Filed: Nov. 19, 2013

(65) Prior Publication Data
US 2015/0137465 A1 May 21, 2015

(51) Int. Cl.
*B62B 3/02* (2006.01)
*B62B 13/16* (2006.01)
*B62B 3/00* (2006.01)

(52) U.S. Cl.
CPC . *B62B 3/02* (2013.01); *B62B 3/005* (2013.01); *B62B 3/007* (2013.01); *B62B 13/16* (2013.01)

(58) Field of Classification Search
CPC .......... B62B 3/02; B62B 3/007; B62B 3/005; B62B 3/022; B62B 13/16; B62B 2205/10; B62B 2205/12; B62B 2205/14; B62B 2301/05
USPC ............ 280/35, 20, 29, 638, 639, 651, 47.18, 280/47.33, 87.05, 87.01, 274, 278, 287, 280/659, 38, 641, 646
See application file for complete search history.

(56) References Cited

U.S. PATENT DOCUMENTS

| | | | | |
|---|---|---|---|---|
| 2,549,958 A * | 4/1951 | Bosk | ................ | B62B 7/10 280/37 |
| 2,587,688 A * | 3/1952 | Bosk | ................ | 280/39 |
| 4,846,493 A * | 7/1989 | Mason | ................ | A45C 5/146 190/18 A |
| 5,028,060 A * | 7/1991 | Martin | ................ | 280/39 |
| 5,306,029 A * | 4/1994 | Kaiser, II | ................ | 280/30 |
| 5,373,708 A * | 12/1994 | Dumoulin, Jr. | ................ | 280/30 |
| 5,480,170 A * | 1/1996 | Kaiser, II | ................ | A47B 31/02 108/80 |
| 5,772,222 A * | 6/1998 | Sim et al. | ................ | 280/30 |
| 5,979,921 A * | 11/1999 | Derven et al. | ................ | 280/204 |
| 6,220,611 B1 * | 4/2001 | Shapiro | ................ | 280/47.34 |
| 6,607,207 B2 * | 8/2003 | Shapiro et al. | ................ | 280/287 |
| 6,729,647 B2 * | 5/2004 | Shapiro et al. | ................ | 280/775 |
| 6,733,026 B1 * | 5/2004 | Robberson et al. | ................ | 280/415.1 |
| 6,845,991 B1 * | 1/2005 | Ritucci et al. | ................ | 280/30 |
| 6,893,030 B2 * | 5/2005 | Shapiro | ................ | 280/47.34 |
| 6,916,028 B2 * | 7/2005 | Shapiro | ................ | 280/47.34 |
| 6,991,249 B2 * | 1/2006 | Shapiro | ................ | 280/648 |
| 7,066,485 B2 * | 6/2006 | Shapiro | ................ | 280/651 |
| 7,100,929 B2 * | 9/2006 | Shapiro et al. | ................ | 280/282 |
| 7,118,115 B2 * | 10/2006 | Abel | ................ | 280/43.13 |
| 7,201,385 B2 * | 4/2007 | Renz et al. | ................ | 280/79.11 |
| 7,246,805 B2 * | 7/2007 | Neal | ................ | A45C 5/14 280/35 |
| 7,264,265 B2 * | 9/2007 | Shapiro | ................ | 280/643 |
| 7,360,784 B2 * | 4/2008 | Stewart et al. | ................ | 280/656 |
| 7,819,408 B2 * | 10/2010 | Shapiro | ................ | 280/47.315 |
| 8,091,916 B2 * | 1/2012 | Shapiro | ................ | 280/644 |

(Continued)

*Primary Examiner* — James M Dolak

(57) ABSTRACT

This application discloses folding, compact support structure assemblies for supporting an article or receptacle including a simplified latch and a support assembly case that move together in tandem as an integrated unit in order to effect release of the support structure assemblies from their operative position, facilitating movement of the entire support assembly and shaft to a compact position inside the profile of the supporting article. The support structure shafts may attach skis, sleds, or wheels. A plurality of equipment engaging removable uprights stow horizontally in slots along the inside walls and a service shelf also conveniently stows flat along the underside or top of the article.

19 Claims, 11 Drawing Sheets

(56) References Cited

U.S. PATENT DOCUMENTS

| | | | |
|---|---|---|---|
| 8,474,833 B2 * | 7/2013 | Shapiro | B62B 7/06 280/43 |
| 8,979,098 B2 * | 3/2015 | Wang | B62B 3/022 280/39 |
| 9,010,770 B2 * | 4/2015 | Cantrell | B62B 5/0083 280/35 |

* cited by examiner

FOLD FLAT ARTICLE SUPPORT ASSEMBLIES WITH SIMPLIFIED RELEASE LATCHES AND STOWABLE SERVICE SHELVES

RELATIONSHIP TO OTHER APPLICATIONS

This application applies to movable and stowable fold flat support structure assemblies with support shaft stands that engage a horizontal surface supporting the article in a spaced relationship, adaptable to a wide array of articles and receptacles. The application provides conversion options to apply various attachments to the support structure assembly shafts, and also provides for a repositionable and stowable service shelf which may, be stowed either on top, or on the underside of a supported article. U.S. Pat. No. 7,819,408 is a prior related patent granted to this inventor, which disclosed support structure assemblies with various innovations. One improvement in this application is that both the latch and an outer case of the support structure assembly move together in tandem as an integrated unit in order to affect release of the support structure assemblies from the operative position, an improvement which reduces moving parts and promotes easier manufacture of the assembly. This application discloses and refines "fold flat" support structure assemblies for articles and receptacles, and includes selectively removable attachments so that the support structures shafts are fixed or may rotate 360 degrees along a vertical shaft axis and may attach skis, sleds, wheels may include support shafts which extend and retract. Another improvement of the application is to provide for a plurality of equipment engaging corner mounted uprights, which, in the stowed position, fit horizontally along the interior aspect of the supported article's side walls, and the application additionally provides for a repositionable and stowable service shelf, held in a spaced relationship from the supported article by virtue of multiple uprights which service shelf may be stowed in unique ways.

FIELD OF THE INVENTION

This application relates to novel support structures which may be folded into a flat profile inside and/or closely adjacent to an article or receptacle, widely applicable to support structures in United States class 248, and its international class equivalent. The support structure assemblies provide for a shaft, mounted to an article, generally perpendicular to the ground surface in an operative position, including several simple mechanisms described in the application that allow the support structure assembly and the support shaft, to be rapidly and conveniently moved and compactly stowed along one or more pivot structures, so that the support structure assembly and support shaft is in a plane near to parallel to the horizontal base of the article. Accordingly, the support shaft and support structures disclosed provide for a compact stowed position of the support structure assembly, within the perimeter of the horizontal frame and side elevational profile of the article. These support structure assemblies are widely applicable to stationary objects, articles and receptacles, as well as to vehicles with running gear, wheels, or skis.

BACKGROUND OF THE INVENTION

The applicant's United States patent applications, including but not limited to U.S. Nos. 7,819,408, 7,066,485 and 6,893,030 applied numerous types of "fold flat" stowable support structures or wheel structures, among other innovations. However, this application both improves upon and expands on the applicability of the stowable support structures to movable or stationary articles or receptacles, including support shafts that are convertible to a variety of articles, as well as movable articles or vehicles. The integrated housing/case and latch design are novel and not provided for in any of applicant's prior applications or in the prior art, and the repositionable service shelves are also new innovations. With regard to the novel support structure assembly design, the applicant's prior U.S. Pat. No. 7,819,408 disclosed a movable "faceplate" or "faceplate grip" design. In order to move the support assembly case from the operative position, a user would manually manipulate the movable faceplate grip, which mounted along one wall of the case, and the faceplate itself was a separate part from the support case, and the faceplate connected to a latch, so that the movable faceplate would cause movement of the latch, to release the case from its operative position. One improvement of this patent application is to eliminate the need for a movable faceplate, or for screws or connectors between the faceplate and the latch. The novel design presented here simplifies the assembly component parts, and integrates them into a simplified support structure assembly case/housing, and provides a new method for entrapment (latching) and release of the support structure assembly support shaft by the assembly parts and the article frame.

SUMMARY OF THE INVENTION

This application provides for compact, stowable "fold flat" support structure assemblies that include a support shaft stand, so that an article is maintained in a spaced relationship from another surface in a first, operative position, and in a second, stowed position the support shaft stand is moved substantially inside the side elevational profile of the article. Improvements include an integrated, latch incorporated into the support shaft assembly case/housing, and additional novel features include stowable and repositionable uprights and a service shelf.

One of the purposes of the invention is to provide for a very simple user grip, which is simply a formed portion of the support structure assembly case, thereby permitting movement of the support structure assembly from the operative, use position, to a compact, stowed position where the support structure assembly is located within the perimeter of the frame perimeter of the article, receptacle or vehicle, and also within the side elevational profile of the article, receptacle or vehicle.

One of the purposes of the invention is to provide for a series of uprights that may hold equipment, or may hold a repositionable storage shelf, and the storage shelf and the series of uprights are all stowable within the side elevational profile and inner aspect of the supported article, and the service shelf may stow contiguous with the top of the supported article or resiliently along the underside of the supported article.

Another object of the invention is to provide for a user manipulable grip integrated into the support structure assembly case (housing) so that releasing the support structure assembly case from the operative position requires no faceplate or separate movable latch components, instead the entire unitary case/housing moves in relation to the article frame.

Another object of the invention is to provide unique means for the support shaft to interconnect to the latch, and for the latch to surround the support shaft, and also the latch secures inside the case, and for these components to interconnect also to the mounting elements.

Another object of the invention is to provide that the support structure assembly disclosed herein may have conversion options transforming the article or receptacle from a stationary article or receptacle, to a moving vehicle, such as a wheeled vehicle or a ski or sled type vehicle.

Another object of the invention is to provide that the shaft of the support structure assembly may be movable and extensible and retractable.

Another object of the invention is to provide that an interconnection bar and a pair of couplers provides for interconnecting at least two article units, and the couplers and the interconnection bar have unique attributes for either operative or stowed positions.

Another object of the invention is to provide for simple shaping of the support stand shaft so that that support stand shaft either rotates 360°, along its vertical axis, or may be fixated, by virtue of the shaft stand's shape in relation to a corresponding shaped portion of the support structure assembly components, or of the support structure case. These features may be appropriate where it is desired that a series of support stands maintain a fixed position, whereas a series of other support stands rotate about a vertical axis.

DESCRIPTION OF THE PREFERRED EMBODIMENTS

Figure 1:
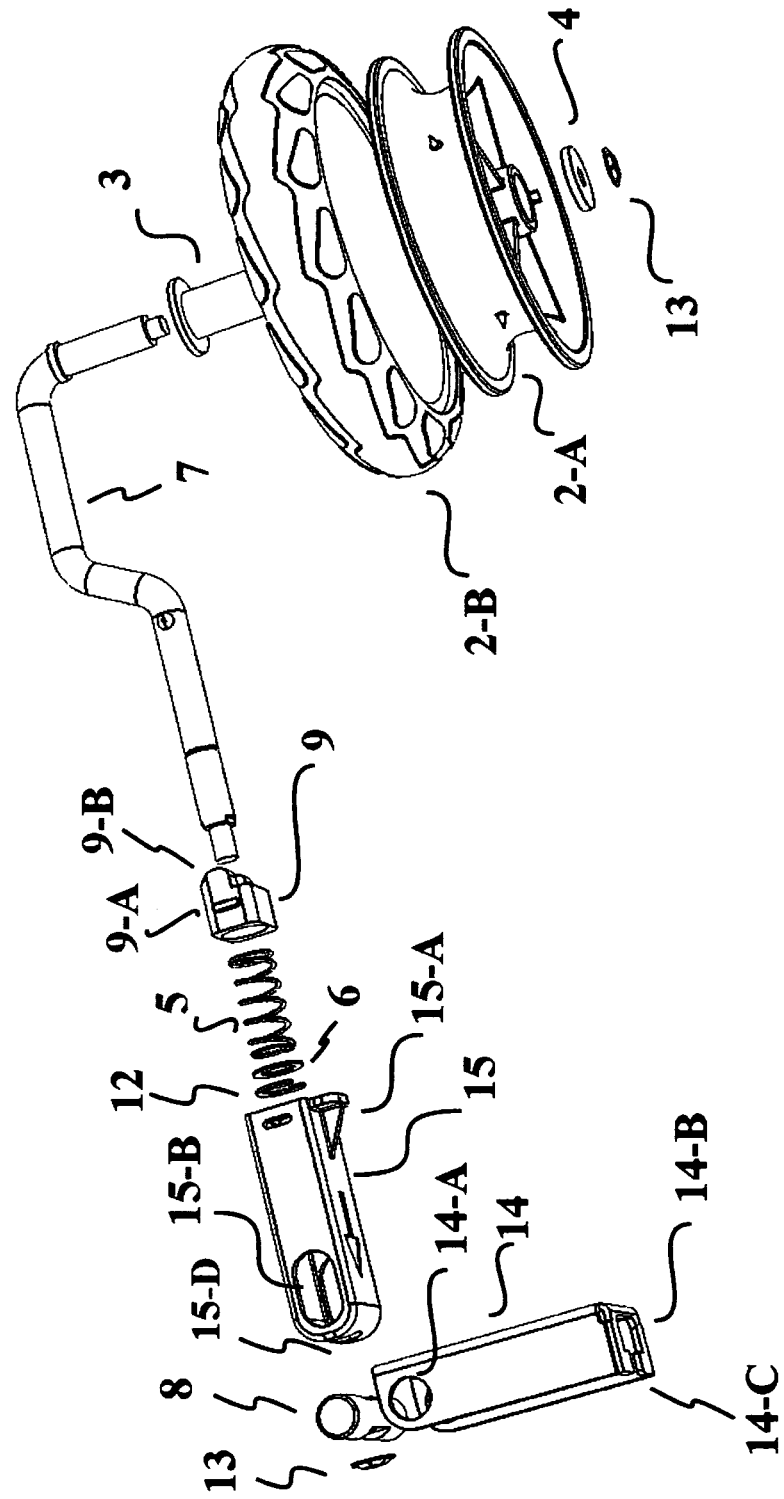
FIG. 1 is a side elevational exploded view of the internal parts of the support structure assembly, including a support structure shaft, and an optional wheel system.

Referring to the drawings, the following are descriptions of the numbered elements: 1—article support base; 2-a—optional wheel hub; 2-b—wheel tread; 3—optional wheel axis bushing; 4—washer; 5—spring; 6—shim; 7—support shaft; 8—pivot; 8-a—support shaft pivot opening; 9—latch block; 9-a—latch block capture ears; 9-b—latch block lower finger; 10—article coupler; 10-a—metal coupler receptors; 10-b—coupler interconnector bar receiving pin; 11—interconnector bar; 11-a—interconnector bar coupler receiving opening; 12—circlip; 13—terminal fixing nut; 14—support structure assembly bracket; 14-a—support structure assembly bracket pivot openings; 14-b—latch block lower finger opening; 14-c—support structure assembly support shaft; 15—support structure assembly case; 15-a—support structure assembly finger case finger grip; 15-b—support structure assembly case bilateral elongated pivot openings; 15-c—support structure assembly case latch block retention opening; 15-d—support structure assembly case terminal fixing nut opening; 16—flexible lanyard; 16-a flexible lanyard protrusions; 17—removable shelf; 17-b—removable shelf underside receiving areas; 18—removable supporting upright; 18-b—upright lanyard receiving opening; 18-c—upgrade stowed position matched openings; 18-D—upright downwardly projecting support projections; 18-E—removable upright equipment receiving arms; 18-F—removable upright shelf receiving shaped end; 19—article wall coupler receiving slot; 20—article wall coupler retention protrusions; 21—upright capture arm receiving openings; 22—article base corner-shaped vertical slot; 23—article base sidewall vertical slot; 24—article base interconnector retention protrusions; 25—article base underside corner receptors; 26—support base horizontal pivot placement slot; and 27—support base movable support structure assembly stowed position retention nibs, and 28—article base support assembly slots.

FIG. 1 shows all of the parts, exploded, of the support structure assembly, including its case, a support bracket, support stand shaft, and an optional wheel system. The assembly is shown in the mounted and setup position in FIG. 3, and in the stowed position in FIG. 2.

The assembly of these support assembly parts shown in FIG. 1 begins with the tire, 2-a, forced onto the tread, 2-B, then are both placed onto a bushing, 3. This optional tire would be then connected to the support stand shaft, 7, after which a washer, 4 and terminal fixing nut, 13, secure the wheel in place on the support stand shaft. Next, the latch block, 9 is placed around the periphery of the support stand shaft, 7, along the terminal end of the support stand shaft, 7, opposite the terminal end that the wheel is interconnected to, and the latch block 9 is slid in the direction toward the wheel. Thereafter, the spring, 5, is slid down the same terminal end of the shaft and secured into the upper edge round recessed opening of the latch block, 9 after which a shim, 6 is then slid on the support stand shaft and finally the shim is followed by a circip, 12, designed to fit within a shallow groove formed into the support stand shaft periphery, 7 thereby causing tension on the spring, 5, which urges the latch block, 9, in the direction toward the bottom of the shaft, closest to the wheel, 2-B, shown in FIG. 1.

Next, the support structure assembly case, 15, is oriented so that the support structure assembly case pivot openings, 15-B are aligned inside the support structure assembly bracket, 14 and it's support structure assembly bracket pivot openings, 14-A. Thereafter, the pivot, 8, is positioned to be passed through one of the support structure assembly bracket pivot openings, 14-*a*, then through the support structure assembly case pivot openings 15-*b*, and then through the second support structure assembly bracket pivot opening, 14-*a*. Finally, the support stand shaft, 7, with the previously stated interconnected components, is oriented into the open bottom of the support structure assembly case, 15, is pressed upwardly toward the opposite end of the case where the pivot, 8, is oriented to allow the terminal end of the support stand assembly, 7 to pass through an opening in the pivot (seen more clearly in FIG. 3, at 8-*a*) and then a small portion of the terminal end of the support stand shaft, 7, protrudes through the upper end of the pivot, 8, allowing placement of a terminal fixing nut, 13 (preferably an inside threaded press on nut, but any suitable nut may be employed). Further, as the support stand shaft, 7, and it's interconnected components, are pressed upwards through the bottom of the support stand assembly case, 15, the latch block, 9 meets the open bottom of the support stand assembly housing, 15 and manual pressure will allow it to be partly pressed inside the support structure assembly case, 15. The latch block, 9, is equipped with bilateral special "ears", 9-*a*, which slightly protrude to match bilateral support case openings near the open bottom of the support structure assembly case, 15. The special ears, 9-*a*, cause a semi-permanent resilient fit thereby securing all of the interconnected components attached to the support stand shaft, 7, into the support structure assembly case, 15, which is secured correspondingly inside the support structure assembly bracket, 14 through the pivot, 8 and connected with a terminal fixing nut, 13.

Figure 2:
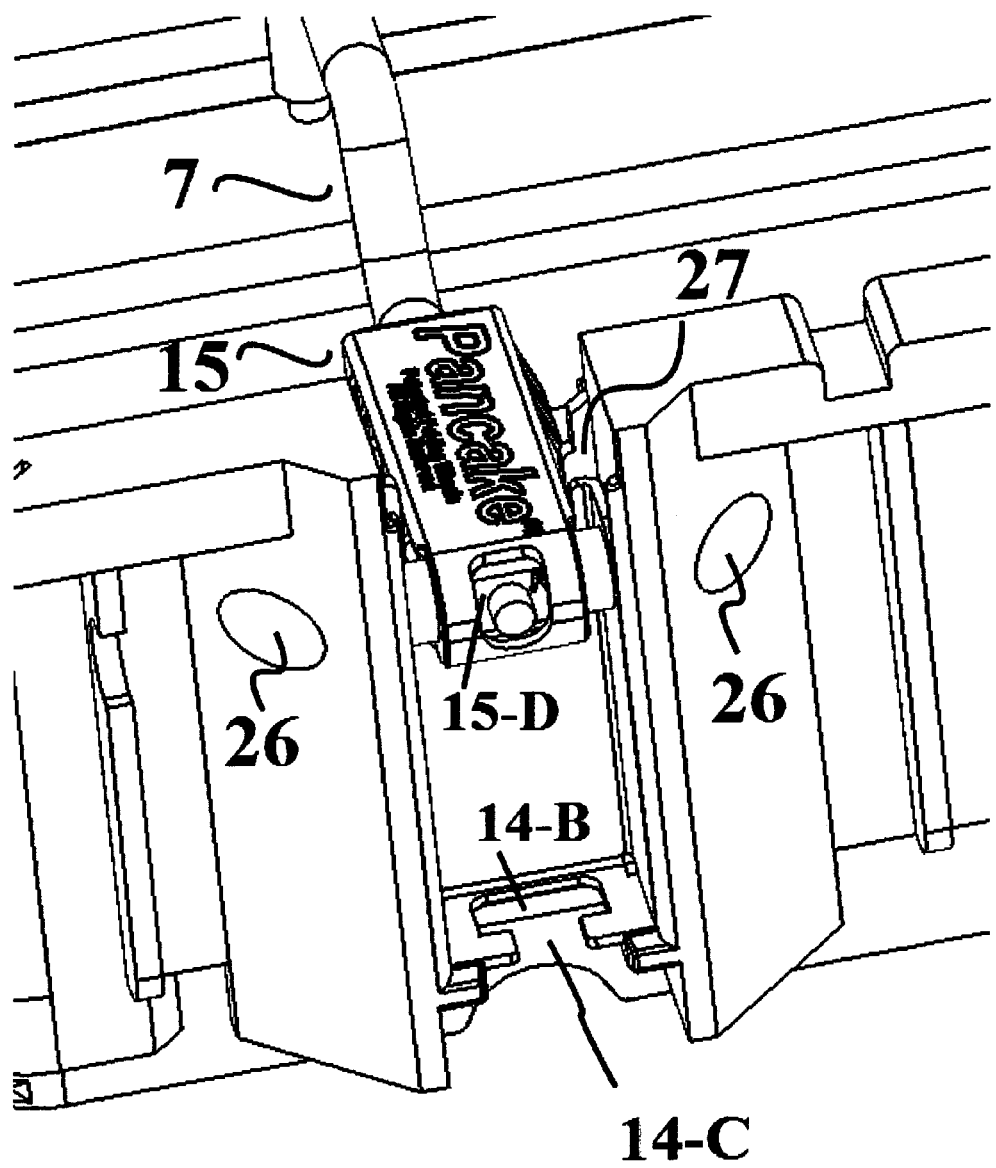
FIG. 2 is a side elevational, slightly elevated view of a portion of the sidewall of a supported article, 1, showing the support structure assembly and case in the fully stowed position (this is the preferred patent cover Figure)
Figure 3:
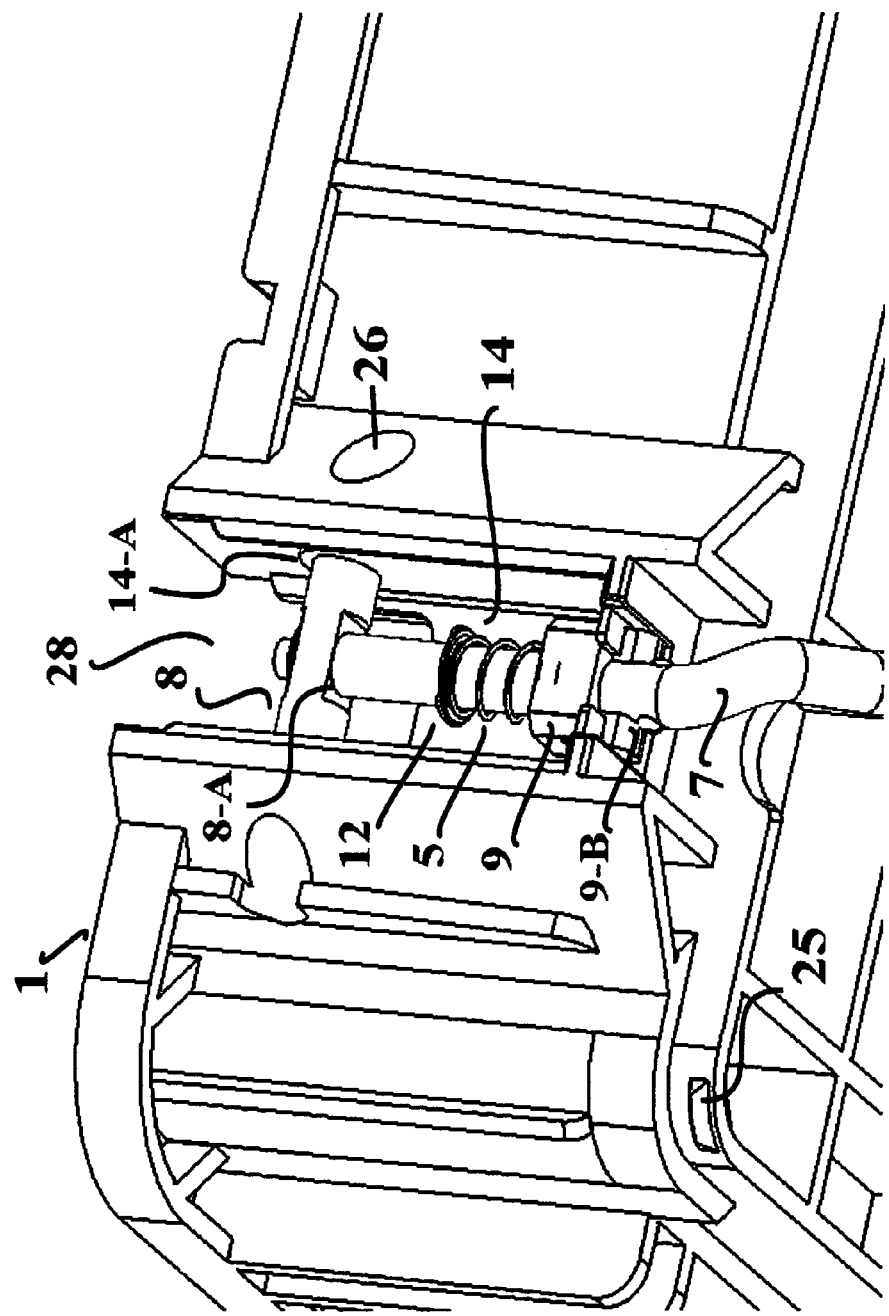
FIG. 3 is a side elevational view, partially from the underside area, showing the support structure assembly in the setup position within the wall of the supported article, 1, with the support structure assembly case removed for better visualization.

Referring to FIGS. 2 and 3, the same set of components described in FIG. 1 are shown in their set up position (FIG. 3) and in their stowed position (FIG. 2) mounted into the vertical wall slot, 28, of a supported article, 1. The pivot, 8, described in the previous FIG. 1, is oriented into the assembly by traveling through bilateral openings in the article walls shown at 26, securing the pivot, 8, structurally. Before the pivot, 8, is placed, the entire support structure assembly bracket, 14, is slid downwards through an open article wall support structure assembly vertical slot, 28. (It is appreciated that another embodiment may omit the bracket, 14, and integrate features 14-B and 14-C into the article wall structure). For easier visualization, FIG. 3 omits the support structure assembly case, 15, as well as its integrated finger grip, 15-*a*. In FIG. 3 the latch block, 9, can be seen latched in the set up position through an opening in the bottom portion of the support structure assembly bracket, 14. Referring to FIG. 2, the support bracket, 14, includes at its bottom area a shaped opening, 14-B, which matches and retains the lower finger of the latch block, 9-*b*, retaining the assembly latch in the set up latched, position. Referring to FIG. 3, in operation, the user presses the finger grip portion of the support structure assembly case, 15 (not shown in FIG. 3) and presses it in the upwards direction, which depresses the spring, 5, and moves the spring biased latch block finger, 9-B also upwards, and importantly, this is possible because of the elongated shaping of the bilateral support structure assembly case elongated pivot openings, and then the user pulls any suitable portion of the support stand shaft, 7 in an outward direction from the article perimeter, and because the latch block, 9 is freed from the enclosed area, 14-B (best seen in FIG. 2) which also allows the support stand shaft to pass outwards from the article through the area 14-C and the support structure assembly can be moved to a stowed position shown in FIG. 2.

Again referring to FIG. 2, the support structure assembly case, 15 and its associated support structure stand, 7 are retained in the stowed position. The support structure assembly case, 15 may optionally be retained in the stowed position by resilient contact between any exterior surface of the case, 15, and male-female resilient contact with surfaces immediately adjacent to the case, 15, as shown by the area marked, 27. Instead of male-female connection between an exterior surface of the case, 15, and the nearby surface, 27, an optional way of achieving a resilient stowed position is by a shaped exterior periphery of the pivot, 8, and any adjacent surface of the article perimeter wall surrounding the pivot, 8, including but not limited to the area noted as 26.

Figure 4:
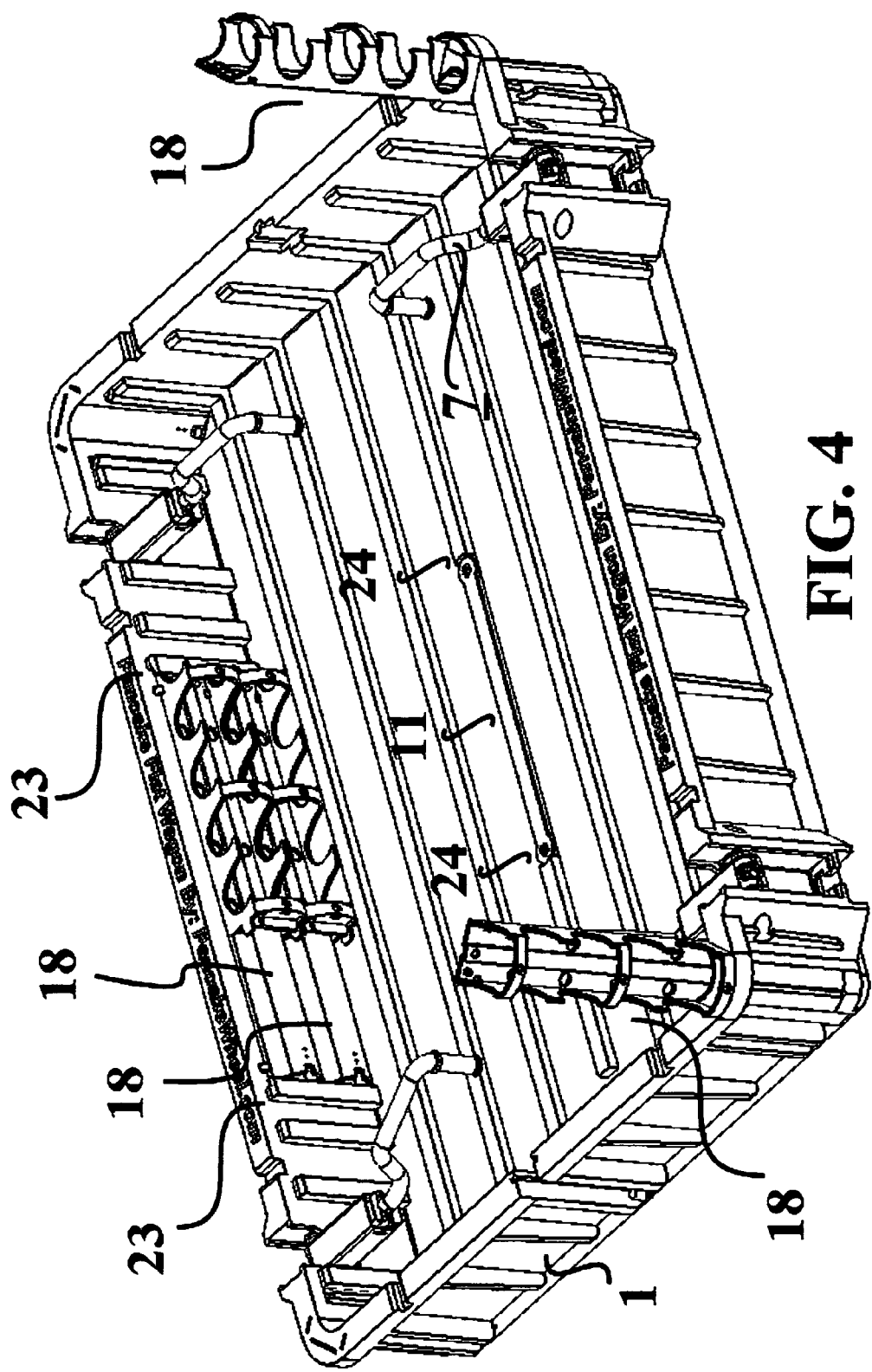
FIG. 4 is a top plan view showing a supported article, 1, along with two removable uprights stowed along the interior sidewall, and two removable uprights in the setup position.

FIG. 4 shows several other parts of the invention, including the series of removable uprights, 18. Two of the uprights, 18 are shown mounted into corners of the article, in their set up position. Two other identical uprights are shown in their stowed position, where they are stacked horizontally inside the side wall of the article, 1. The horizontally stowed uprights, 18, slide into their stowed position along a pair of article base side wall vertical slots, 23. Both the upper and lower terminal ends of the uprights, 18, are shaped to slide within the article base side wall vertical slots, 23. The user uses manual pressure to press the uprights, 18 upwards and the upright, 18 to release them, and the upright has a second, set up position, where it is slid downwards through matching article base corner-shaped vertical slots, 22, more clearly shown in FIG. 5. However FIG. 4 also shows another special part, an interconnection bar, 11, which mounts to the floor of the article, along a set of protrusions, 24, that correspond with openings in the interconnection bar. The interconnection bar is discussed in more detail in FIGS. 10 and 11. FIG. 4 also shows the stowed position of the support structure assembly and the associated support shaft, 7.

Figure 5:
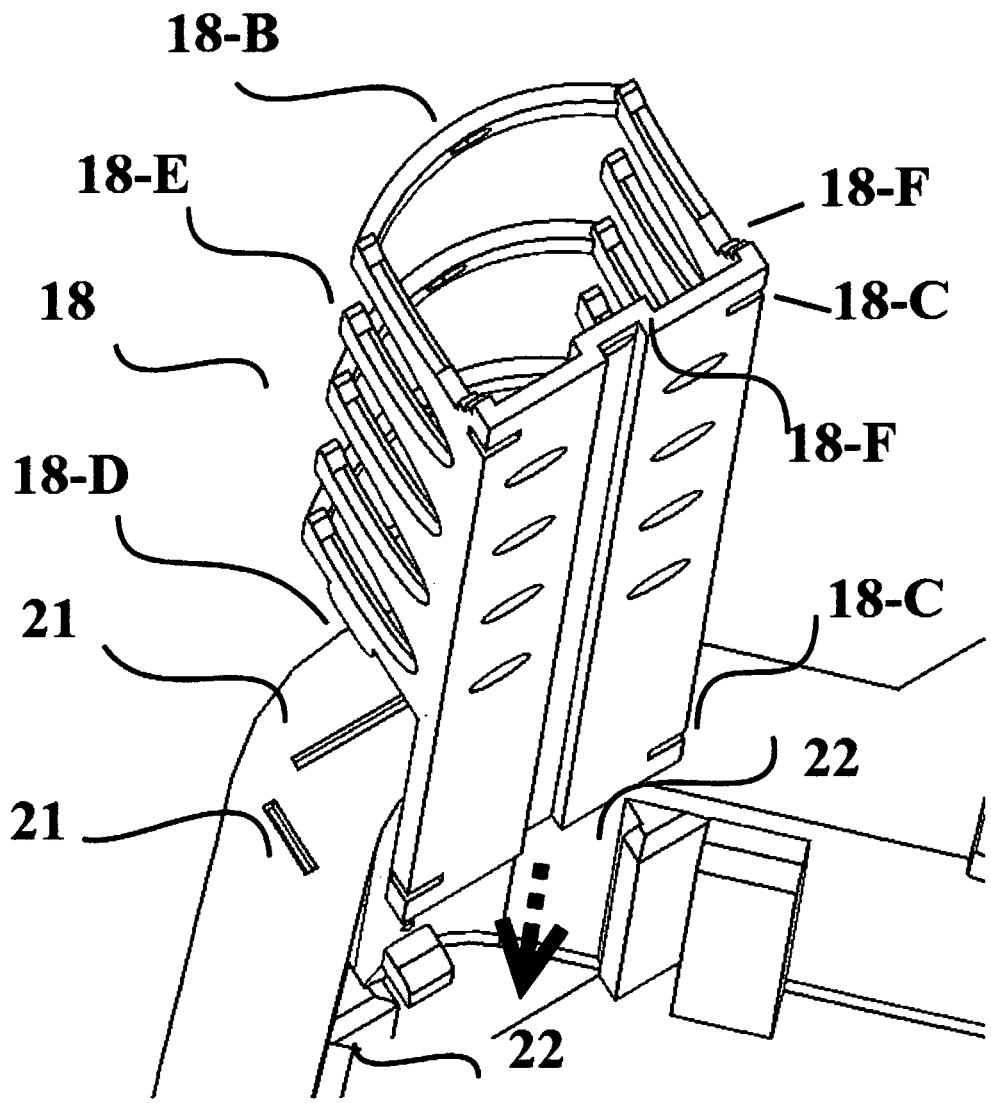
FIG. 5 is an elevated view, cutaway, of the corner of the supported article, 1, showing the removable upright just above the supported article corner vertical slots, which retain the upright in the set up position.
Figure 6:
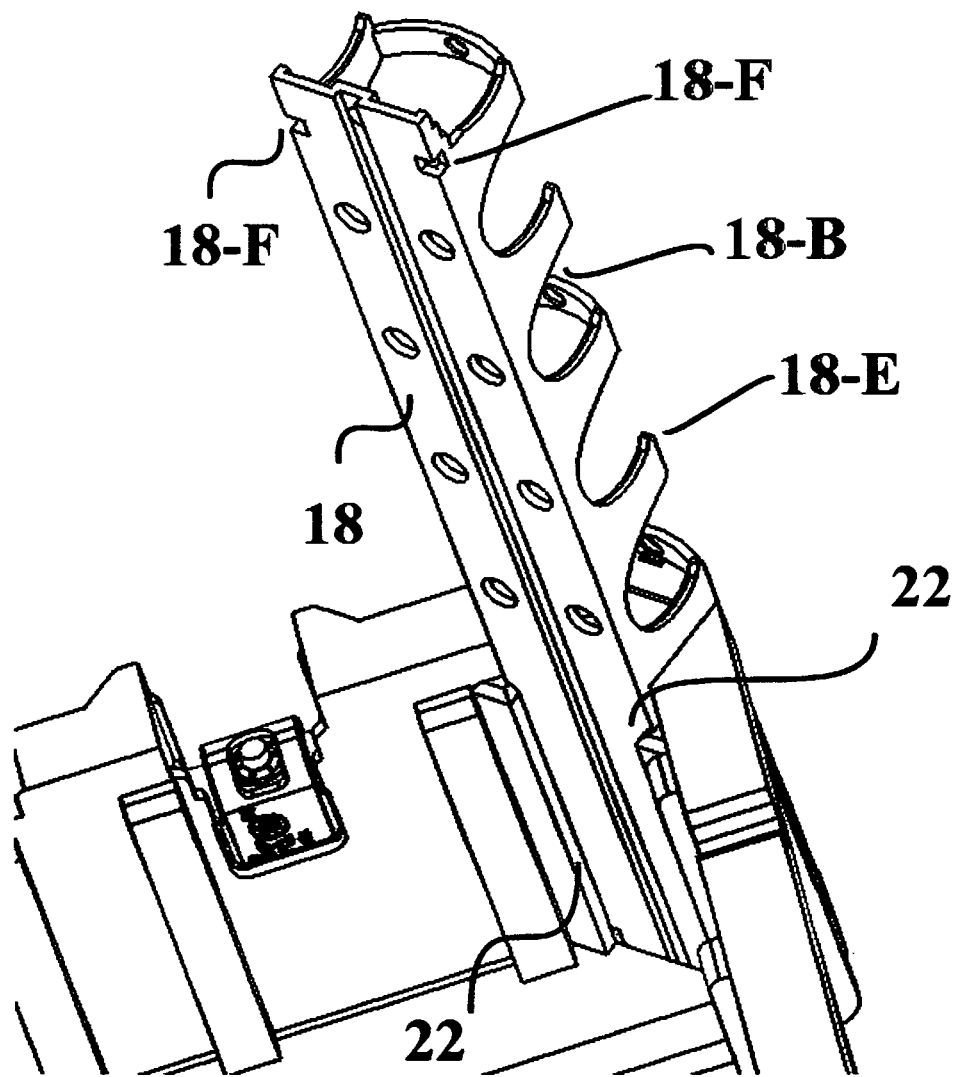
FIG. 6 is a different, slightly elevated, view of a corner of the supported article, 1, showing the removable upright in the fully set up position within the corner slot of the article.
Figure 7:
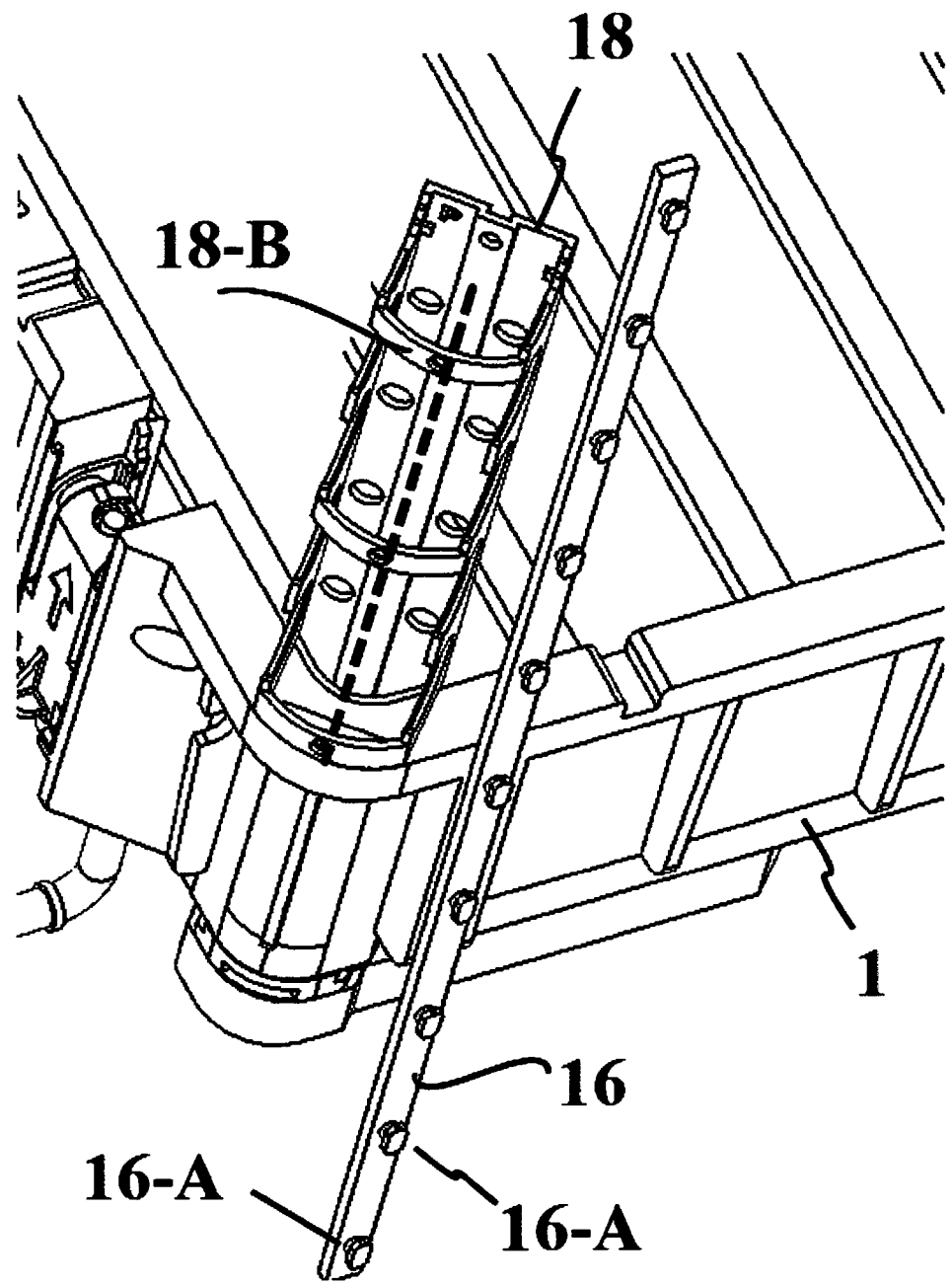
FIG. 7 is a slightly elevated view of the corner of the supported article, showing the removable upright in the setup position; along with a flexible material lanyard which adjustably connects to the upright arms to secure miscellaneous objects or equipment.
Figure 8:
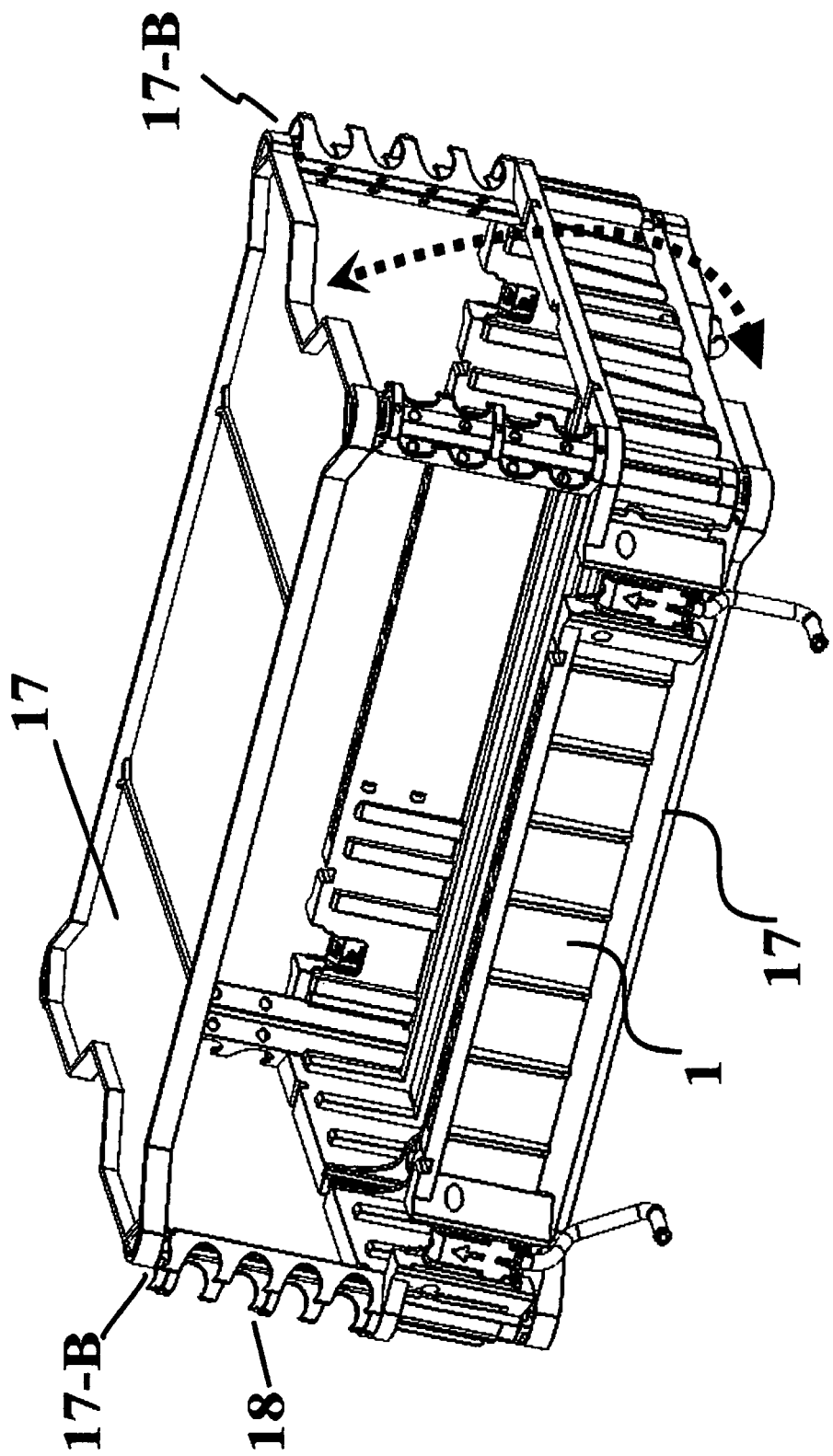
FIG. 8 is a side elevational view, slightly elevated, of a supported article, 1, showing the setup removable uprights, 18, and adding the removable shelf, 17.
Figure 9:
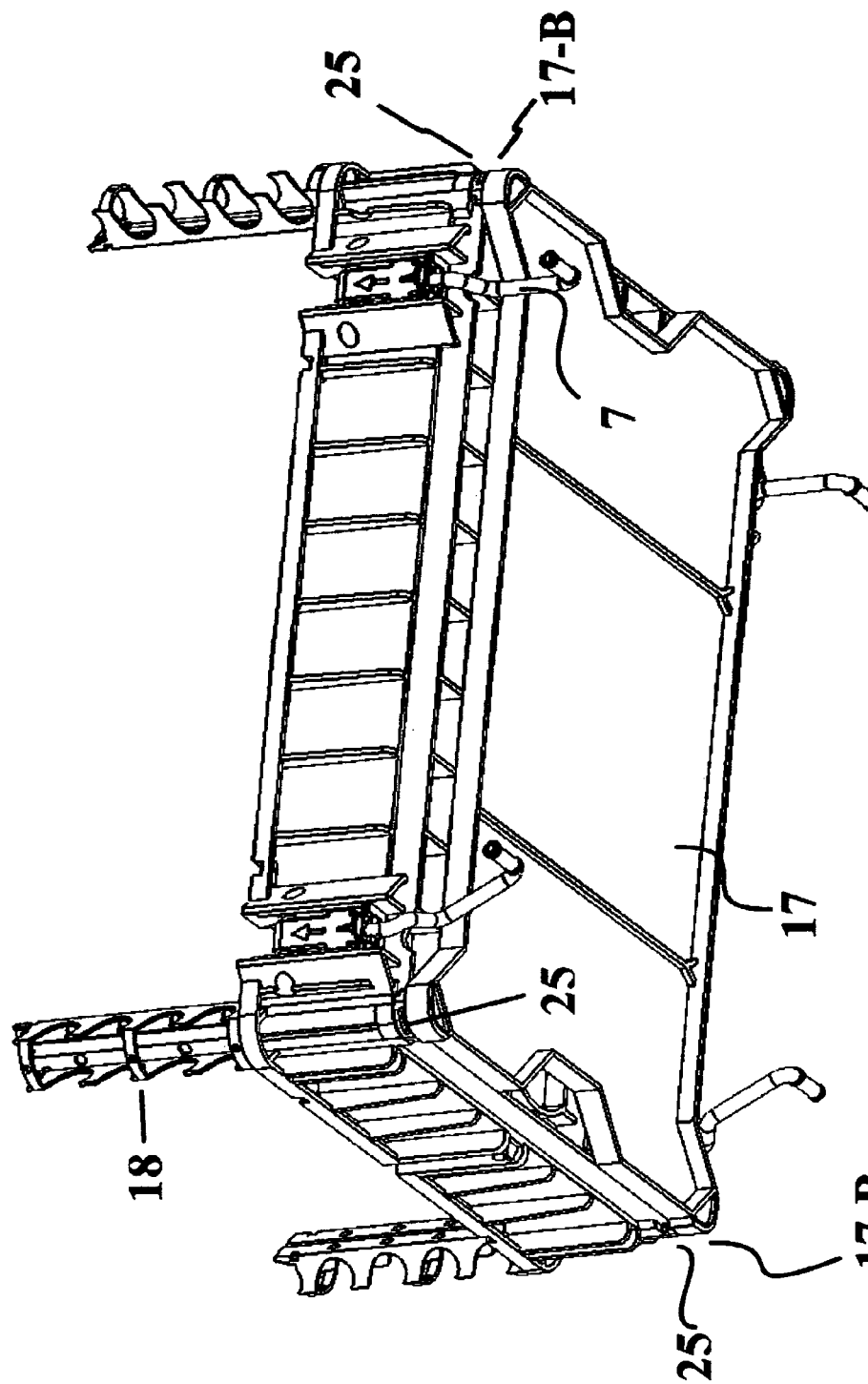
FIG. 9 is a side elevational view, slightly from the underside, showing the supported article, 1, as well as the stowable shelf, 17, in one of its possible stowed positions, resiliently attached to the underside of the supported article.

FIGS. 5, 6 and 7 focus on the novel features of the removable uprights, 18. One of the uprights, 18 is shown oriented just above the article base corner-shaped vertical slots, 22, in FIG. 5. As seen in both FIGS. 5 and 6, the lower edges of the upright, 18, fit within the matched opening of the shaped vertical slots at the article base corners, denoted as 22. The upright has a series of arms, 18-E designed to engage or retain miscellaneous types of equipment. Downwardly directed fingers of the upright, 18-D (FIG. 5) are designed to match openings or recesses in a portion of the article exterior lip, 21, which assists with stabilizing the upright, 18. Shaped portions near both the upper and lower terminal ends of the upright, 18, denoted as 18-C, assist with retaining the upright in the horizontal stowed position along the inner aspect of the article perimeter walls, not shown in FIG. 5 or 6. FIG. 5 shows additional detail of the uppermost terminal edge of the upright, 18-F, which shaping assists in stabilizing the removable shelf, 17, when mounted to the top of the uprights as shown in FIGS. 8 and 9. The specific orientation of each of the four corner uprights, 18 allows for equipment to be retained on each individual corner, or, alternatively elongated equipment such as fishing poles or tools with long handles may be mounted horizontally along the length of the article on the arms, 18-*e* (not shown in Figures).

FIG. 7 adds one additional dimension to the utility of the uprights, 18. A flexible material forming a lanyard, 16 (a defined length of flexible material which may be attached to the uprights), including but not limited to a lanyard formed from rubberized material, which includes a repeating series of protrusions, 16-*a*. Each upright, 18, has a series of arms, 18-B, which each include a through hole which matches protrusions along the flexible lanyard, 16-*a*. A user may secure the lanyard protrusions to the through holes in the upright support arms, 18-*b*, to help secure miscellaneous equipment of different shapes and sizes that rest along the arms formed outwards along the uprights.

FIGS. 8 and 9 shows the uprights, 18, mounted in the set up position in the corners of the article, 1. An optional removable and stowable shelf, 17 is shown in FIG. 8 mounted to the top of the uprights. The removable shelf, 17, at the underside of the four corners, has shaped upright receiving areas, 17-B, which are specially shaped to receive matching shaped portions at the terminal upper edge of the uprights, 18-F. FIG. 8 shows that a shelf, 17, may be removed from the four uprights, 18, and then may be inverted and resiliently attached to the underside of the article, 1, as shown by the dashed lines and arrows, and a second removable shelf, 17, is resiliently retained to the underside of the article in FIG. 8. In order to retain the removable shelf, 17, to the underside of the article base, a shaped portion of the underside of the shelf, 17-B, previously discussed in FIG. 8, has a special shaped portion that creates a male-female resilient connection to the underside of the corner of the article base (refer also to FIG. 3, at 25).

Figure 10:
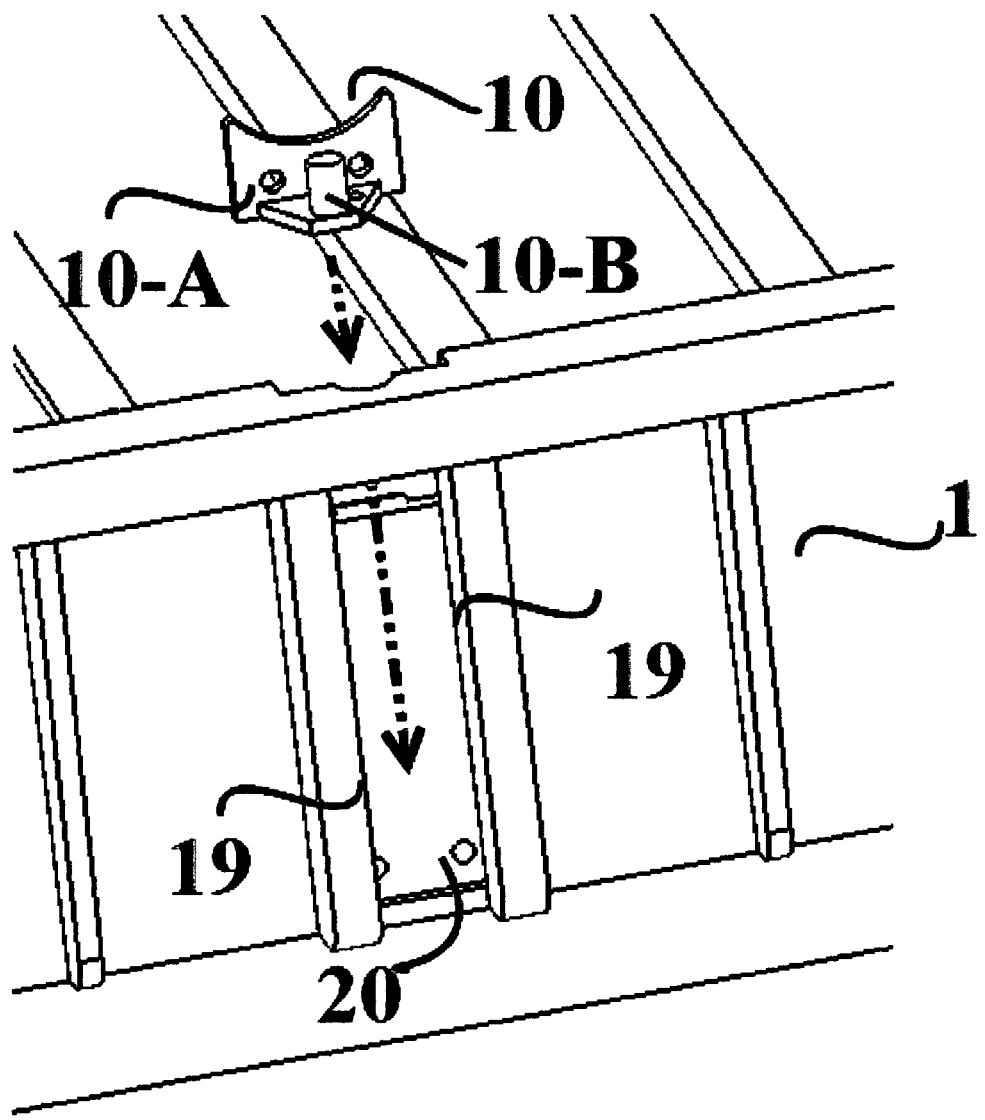
FIG. 10 is a side elevational view of an end wall of the supported article, 1, showing an article coupler, 10 and a receiving slot, 19.
Figure 11:
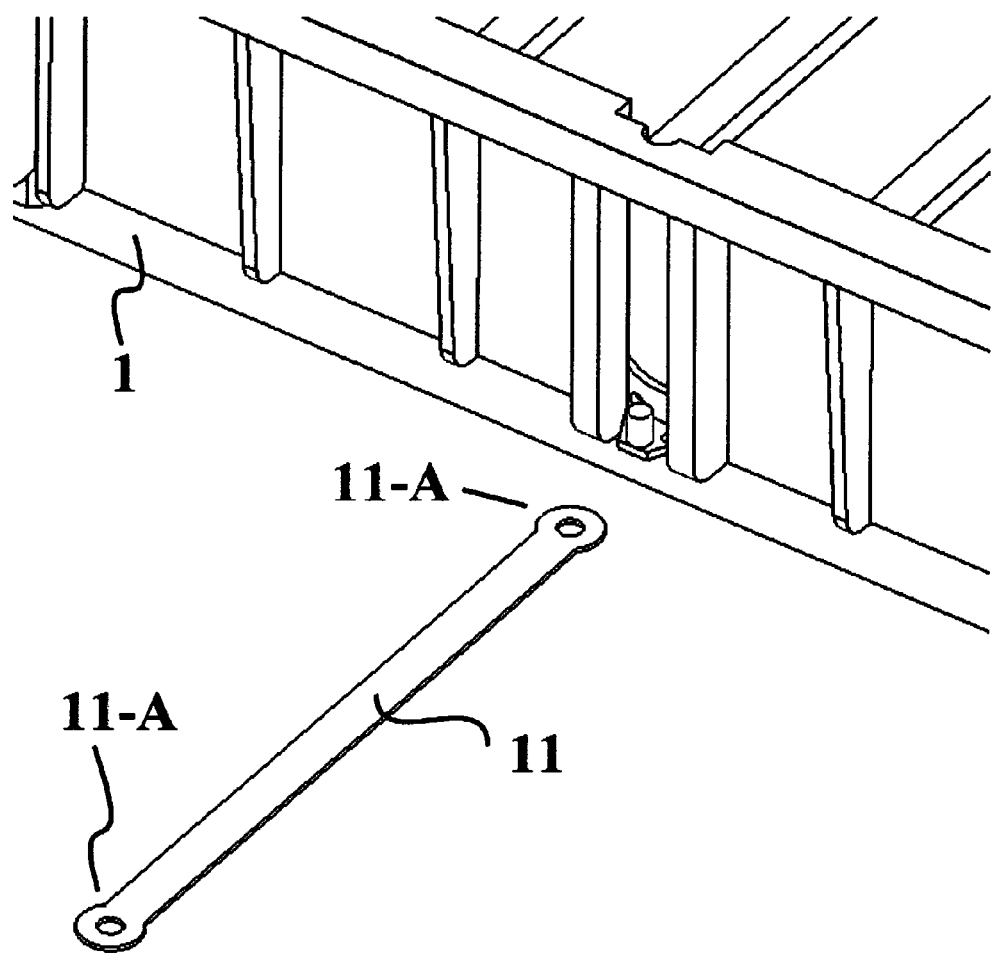
FIG. 11 is another end elevational view of the supported article, 1, slightly elevated, showing a coupler, 10, in the setup position, along with an interconnection bar, 11, suggesting its use.

Now referring to FIGS. 10 and 11, a simple system to create a spaced relationship between at least two article base units is disclosed, using an interconnection bar, 11 designed to slide onto a series of at least two couplers, 10. In use, the user slides the coupler, 10, downwards, as indicated by the dashed lines and arrows in FIG. 10, through an article base end wall slot, 19. The coupler, 10, is retained in its set up position by virtue of male-female retention, which may take the form of openings through the coupler, 10, denoted as 10-a, which are captured at protrusions along the end wall article surface, denoted as 20 in FIG. 10. The male-female connection may be reversed from that described here in FIG. 10. The coupler, 10, includes a coupler interconnector bar receiving pin, 10-B.

Referring now to FIG. 11, the interconnection bar 11, includes suitable openings near its terminal ends, 11-A, which are shaped to fit around these coupler interconnection bar receiving pin, 10-B, thereby allowing the interconnection bar, 11, to maintain at least two article base units in spaced relationship from each other. When wheels, sleds or skis are mounted to a support stand shaft of at least two article base units, the interconnection bar allows one unit to push or pull two or more units together.

It is appreciated that elements described can be mixed and matched, and that the supported articles may be converted to wheeled vehicles, to skis, or that the innovations may be used with any type of article that adopts a fixed support shaft that is foldable into the article profile.

What is claimed is:

1. A support structure assembly operable with a supported article, said assembly comprising: at least one latch;
wherein said supported article comprises:
at least one article perimeter frame portion defining a side elevational profile, as well as at least one support structure assembly receiving cavity, formed out of open space in the perimeter frame portion thickness, which receives at least one support structure assembly;
wherein the support structure assembly includes a case with a plurality of support surfaces perpendicular to a substantially open bottom portion, including at least one finger gripping area formed along the periphery of one of the perpendicular case support surfaces, defining a support structure assembly case periphery with interconnected components substantially recessed within said periphery; and the support structure assembly's interconnected components further include both support structure assembly mounting means and support stand shaft attaching means interconnected to at least one support stand shaft; at least partly within the support structure assembly case periphery are transversely disposed, oppositely extending mounting elements, which occupy adjacent portions of the article perimeter frame portion, about which the support structure assembly pivots, the at least one support stand shaft enters a substantially open bottom portion of the support structure assembly case through an opening inside the latch, wherein the latch is further mounted along the support stand shaft, and interconnection means between the periphery of the latch and the support structure assembly case secure the interconnected components together; and
in a first operative position of the support structure assembly the at least one support stand shaft is orthogonal to the article perimeter frame providing support, and the periphery of the support structure assembly case substantially occupies the support structure assembly receiving cavity; and at least one male-female connection between the latch and the article perimeter frame positively latches the support structure assembly case to the perimeter frame in the first operative position, and in a second, stowed position of the support structure assembly case, the male-female connection between the latch and the article perimeter frame is released, the support stand shaft attaching means and the interconnected at least one support stand shaft of the support structure assembly are swept through an angle during movement of said support structure assembly between the first operative position and the second stowed position such that the plane defined by the support structure assembly and interconnected support stand shaft in the second stowed position extends substantially parallel with the side elevational profile of the article perimeter frame and the support stand shaft is located within the article perimeter frame; and
wherein manual movement of the support structure assembly from the second, stowed position, back to the first, operative position, positions the support structure assembly in contiguous orientation to the support structure assembly receiving cavity, permitting engagement of the at least one male-female connection between the latch and the article perimeter frame.

2. The support structure assembly of claim 1, wherein at least one wheel is attached to the at least one support stand shaft providing rolling support to the supported article.

3. The support structure assembly of claim 1, wherein the support stand shaft includes a ground engaging ski.

4. The support structure assembly of claim 1, wherein the at least one support stand shaft is extensible and retractable in a vertical plane between the article perimeter frame and the support surface.

5. The support structure assembly of claim 1, wherein the at least one support stand shaft is fixated to prevent rotation about the vertical axis of the support stand shaft by a shaped portion of the support stand shaft contacting a corresponding shaped portion of the support structure assembly, preventing axial rotation of the support stand shaft about the vertical axis.

6. The support structure assembly of claim 1, further including a plurality of stowable, removable, shaped uprights each defined by a series of equipment receiving arms along an elongate shaft, and specially shaped upper and lower terminating portions, and in a first, operative position, the uprights are resiliently retained in a vertical orientation, within interior corners of the supported article, and in a second, stowed position the at least one upright is stowed horizontally along upright walls of the supported article for storage.

7. The support structure assembly of claim 6, wherein the plurality of uprights are placed in the first operative position, and in the first operative position a removable shelf is resiliently attached to a series of specially shaped upper terminating portions of the uprights, wherein the terminating portions also correspond to specially shaped receiving portions on an underside of the shelf, and in a second, stowed position the shelf is resiliently attached along an underside of the supported article.

8. The support structure assembly of claim 6, wherein the elongate shaft of the uprights includes the series of receiving arms, and a length of flexible material which serves to create closed vertical loops between at least two receiving arms along the uprights by virtue of a male-female connection between the length of flexible material and the at least two receiving arms.

9. The support structure assembly of claim 1, wherein at least two couplers, in their operative positions, slide downwards through a formed slot in the end wall of at least two adjacent articles, positioning a retaining pin portion of each coupler facing outwards from the periphery of the article, and an interconnection bar with a shaped opening near each of two terminating ends, which interconnection bar, in an operative position, is joined to the retaining pins of the two couplers, maintaining at least two such articles in a spaced relationship and providing that movement of at least one of the articles provides movement to at least one other interconnected article, and in a second position, the interconnection bar is removed from each of the coupler pins.

10. A support structure assembly operable with a supported article, comprising: at least one support stand shaft, a latch with at least one finger portion, and a support structure assembly case having a support surface, as well as a mounting pivot wherein said mounting pivot is oriented horizontally and travels through bilateral elongated openings in the support structure case, and for assembly the support stand shaft travels through a central opening in the latch, and portions of an exterior of the latch are affixed to an interior aspect of the support structure assembly case via a male-female connection with a perimeter frame of the supported article and the at least one finger portion of the latch, thereby securing the latch to the support shaft, and in addition an upper terminal end of the support stand shaft travels through an opening in the pivot and is further secured to the pivot with a terminal fixing nut and in operation, the at least one finger portion of the latch is manually manipulable to secure and release the support structure assembly for vertical movement in relation to the horizontal plane of the pivot, and in a first, operative position the support structure assembly supports the article, and in a second, stowed position the support structure assembly is swept along the vertical plane to a stowed position substantially inside the perimeter of the supported article.

11. The support structure assembly of claim 10, wherein at least one wheel is attached to the at least one support stand shaft providing rolling support to the supported article.

12. The support structure assembly of claim 10, wherein the at least one support stand shaft is extensible and retractable in a vertical plane between the perimeter frame and a support surface of the case.

13. The support structure assembly of claim 10, wherein the at least one support stand shaft is fixated to prevent rotation about the vertical axis of the support stand shaft by a shaped portion of the support stand shaft contacting a corresponding shaped portion of the support structure assembly, preventing axial rotation of the support stand shaft about the vertical axis.

14. A support structure assembly operable with a supported article including at least one support stand shaft, a latch with at least one finger portion, and a support structure assembly case, as well as a mounting pivot, wherein said mounting pivot is oriented horizontally and travels through bilateral elongated openings in the support structure case, which provides for motion of the support structure case so that the support structure case may be swept along a vertical plane in relation to the mounting pivot, and for assembly the support stand shaft travels through a central opening in the latch, and portions of an exterior of the latch are affixed to an interior aspect of the support structure assembly case, thereby securing the latch to the support shaft, and in addition an upper terminal end of the support stand shaft travels through an opening in the pivot and is further secured to the pivot with a terminal fixing nut, and a male-female connection between the at least one finger portion of the latch of the support structure assembly and a perimeter frame of the supported article, and in operation, the at least one finger portion of the latch is manually manipulable to secure the male-female connection between the support structure assembly and the supported article in a first operative position, and in a second, released position, the male-female connection between the support structure assembly and the supported article is released, which release permits the support structure assembly to be swept vertically between the first, operative position substantially aligned with the outer periphery of the supported article, to the second released position permitting storage of the support structure assembly substantially inside the perimeter of the supported article.

15. The support structure assembly of claim 14, wherein at least one wheel is attached to the at least one support stand shaft providing rolling support to the supported article.

16. The support structure assembly of claim 14, wherein the support structure assembly is maintained substantially inside the perimeter of the supported article by resilient contact between at least one surface of the support structure assembly and the supported article.

17. The support structure assembly of claim 14, further including a plurality of stowable, removable, shaped uprights each defined by a series of equipment receiving arms along an elongate shaft, as well as specially shaped upper and lower terminating portions, and in a first, operative position, the uprights are resiliently retained in a vertical orientation, within a plurality of vertical oriented upright receiving slots formed within interior corners of the article, and in a second, stowed position, at least one upright is retained and stowed horizontally along at least one upright wall of the supported article.

18. The support structure assembly of claim 17, including the plurality of uprights placed in the first operative position, and in the first operative position a removable shelf is resiliently attached to the plurality of specially shaped upper terminating portions of the uprights, wherein the upper terminating portions also correspond to specially shaped receiving portions on an underside of the removable shelf, and in a second, stowed position the shelf is resiliently attached along an underside of the supported article.

19. The support structure assembly of claim 14, wherein at least two couplers, in their operative positions, slide downwards through a formed slot in an end wall of at least two adjacent supported articles, positioning a retaining pin portion of each coupler facing outwards from the periphery of the article, and an elongate interconnection bar with a shaped opening near each of two terminating ends, which interconnection bar, in a first operative position, is joined to the retaining pins of the two couplers, maintaining at least two such supported articles in a spaced relationship, and providing that movement of at least one of the supported articles provides movement to at least one other interconnected supported article, and in a second position, the interconnection bar is removed from each of the coupler pins.

* * * * *